United States Patent [19]

Gano

[11] Patent Number: 4,705,450

[45] Date of Patent: Nov. 10, 1987

[54] SINGLE ENGINE EXCAVATOR WITH REMOTE CONTROL

[75] Inventor: John W. Gano, New Philadelphia, Ohio

[73] Assignee: The Gradall Company, New Philadelphia, Ohio

[21] Appl. No.: 807,616

[22] Filed: Dec. 11, 1985

[51] Int. Cl.[4] .................... B60K 17/28; B60K 26/02

[52] U.S. Cl. .................................... 414/687; 60/420; 60/421; 180/53.4; 180/53.8; 180/323; 180/324; 414/718

[58] Field of Search ............... 414/687, 690, 718, 728; 37/DIG. 17; 180/53.4, 53.7, 53.8, 321, 323, 324, 6.58, 6.6; 60/420, 421, 427

[56] References Cited

U.S. PATENT DOCUMENTS

| | | | |
|---|---|---|---|
| Re. 31,500 | 1/1984 | Brownfield . | |
| 2,638,232 | 5/1953 | Perkins | 180/324 X |
| 2,704,131 | 3/1955 | Vahs | 180/306 |
| 2,708,400 | 5/1955 | Logus | 60/437 |
| 2,731,097 | 1/1956 | Zeilman et al. | 180/324 X |
| 2,765,041 | 10/1956 | Norrie et al. . | |
| 2,783,556 | 3/1957 | Burns et al. | 37/90 |
| 2,817,911 | 12/1957 | Owen et al. | 37/90 |
| 2,866,510 | 12/1958 | Flamm | 180/53.7 |
| 2,959,260 | 11/1960 | Johnson et al. . | |
| 2,979,908 | 4/1961 | Shook | 414/687 X |
| 2,981,012 | 4/1961 | Meyer | 37/86 |
| 3,300,069 | 1/1967 | Kline | 414/718 |
| 3,587,886 | 6/1971 | Gano et al. | 414/718 |
| 3,599,814 | 8/1971 | Brownfield | 180/53.4 |
| 3,666,125 | 5/1972 | Gano et al. | 414/718 |
| 3,854,160 | 12/1974 | Hildebrand et al. | 15/84 |
| 3,913,697 | 10/1975 | Greene | 180/53.4 |
| 3,935,917 | 2/1976 | Eley et al. | 180/53.4 |
| 3,949,824 | 4/1976 | Bennett | 180/305 X |
| 4,015,482 | 4/1977 | Ito et al. | 74/15.84 |
| 4,023,364 | 5/1977 | Bianchetta | 414/687 X |
| 4,036,508 | 7/1977 | Eddy et al. | 180/53.1 X |
| 4,162,714 | 7/1979 | Correll | 180/53.4 |
| 4,189,021 | 2/1980 | Scheuerpflug et al. | 414/718 X |
| 4,318,451 | 3/1982 | Liggett . | |
| 4,467,604 | 8/1984 | Forster | 180/6.58 X |
| 4,484,655 | 11/1984 | Sheppard, Sr. | 180/305 X |
| 4,516,655 | 5/1985 | Donahue et al. | 37/DIG. 17 |

FOREIGN PATENT DOCUMENTS

| | | | |
|---|---|---|---|
| 2915964 | 11/1980 | Fed. Rep. of Germany | 180/53.2 |
| 3219971 | 12/1983 | Fed. Rep. of Germany | 180/305 |
| 846241 | 8/1960 | United Kingdom | 414/690 |
| 337469 | 2/1978 | U.S.S.R. | 37/DIG. 17 |

OTHER PUBLICATIONS

Funk Series 8000 Powershift Transmission Brochure 4 pages.

Gradall Pamphlet, May 31, 1955, 20 pages.

*Primary Examiner*—Robert J. Spar
*Assistant Examiner*—P. McCoy Smith
*Attorney, Agent, or Firm*—Robert D. Yeager; George D. Dickos

[57] ABSTRACT

A material handling vehicle is provided which includes a lower truck chassis and an upper material handling structure pivotally supported by the lower chassis, all functions of which vehicle are driven by a single engine. The material handling vehicle is controllable from a main truck cab on the truck chassis or from an upper operator's cab mounted on the upper structure. The single engine provides highway travel power and power to all excavator functions, while the vehicle, including remote travel and implement manipulation capabilities, may be controlled from the upper operator cab. The main engine, when used for over the highway travel, powers the driven wheels through a power shift transmission in a conventional manner. When at an excavating site and controlled from the upper cab, the main engine, through a power takeoff on the top of the torque converter connected to the engine, drives a hydraulic pump which supplies hydraulic fluid to a flow divider to power the implement hydraulics and to drive a hydraulic drive motor in response to controls from the upper operator cab. The hydraulic drive motor drives into a secondary power input on a lower portion of the transmission to provide power through the transmission to the driven wheels.

23 Claims, 10 Drawing Figures

SINGLE ENGINE EXCAVATOR WITH REMOTE CONTROL

BACKGROUND OF THE INVENTION

Reference is made to the following pending U.S. patent applications which were filed on the same date the instant application was filed, are owned by the assignee of the present application, and which relate to the same commercial apparatus on which this instant invention is empolyed: Ser. Nos. 807,553, 807,573, 807,617 and 728,511.

1. Field of the Invention

This invention relates to a material handling vehicle and, more particularly, to a material handling vehicle having a lower truck chassis which includes a truck cab and an upper structure which includes an upper cab and a material handling implement, such vehicle having a single engine on the lower chassis which provides power for operation under the control of an operator in either cab.

2. Description of the Prior Art

Frequently, a heavy duty material handling vehicle such as a crane or excavator includes a lower or truck chassis on which is horizontally pivotally mounted an upper structure that supports the desired material handling implement. The truck chassis is capable of being driven over the road or highway under the control of an operator in the main truck cab. An upper structure is mounted on the truck chassis by a swing bearing through which a center pin extends for relative movement with respect to the truck chassis. An upper structure operator's cab is provided on the upper structure to move with a material handling boom and implement. During operation at a contruction site, an operator in the upper structure operator cab can control movement of the truck chassis and also the material handling mechanism.

Heretofore, in order to provide for remote operation from the upper structure cab of both the manipulations of the material handling mechanism as well as the movement of the entire vehicle, two separate engines were required. One engine was mounted on the truck chassis and controlled the highway operation of the vehicle. A separate engine was mounted on the upper structure and provided motive power both to the material handling mechanism as well as powering, through a hydraulic pump and motor, the motion of the truck chassis. U.S. Pat. No. 3,599,814 teaches a remote drive mechanism for powering the drive wheels from an auxilliary engine mounted on the upper structure. U.S. Pat. No. 4,318,451 also teaches a material handling vehicle having a power supply on the upper structure which through a hydraulic motor drives the vehicle at the job site.

As is well known in the art, the previously unavoidable requirement of two separate engines, one on the truck chassis and one on the upper structure, was fraught with a host of disadvantages. For example, with the prior art construction requiring two separate engines the additional weight and cost of the auxilliary engine itself as well as duplicate fuel tanks, radiators, battery and charging systems, air compressors and dryers, power steering pumps, air cleaners and exhaust systems, controls, shroudings and mountings, noise barriers, engine gauges, etc., are incurred. In addition, duplicate maintenance functions are involved in a two-engine vehicle and operating costs are necessarily increased. Further, the inclusion of the second engine and hydraulic reservoir on the movable upper structure raises the center of gravity of the material handling vehicle. Such a high center of gravity imposes engineering and operating restrictions which are considerable.

The subject invention is directed toward an improved material handling apparatus which overcomes, among others, the above-discussed problems with material handling vehicles which employ two engines, one for on-road travel and one for remote operation controlled from an upper cab, which is effective to sufficiently power all customary remotely controlled functions of a material handling apparatus while requiring only one engine.

SUMMARY OF THE INVENTION

In accordance with the present invention, there is provided an improved material handling vehicle which includes a lower chassis having a truck cab and a relatively movable upper structure pivotally mounted on the lower chassis and having an operator's cab thereon. However, unlike prior art material handling vehicles, the present apparatus requires only a single, lower chassis mounted engine for powering both movement of the vehicle to the job site under the control of an operator in the truck cab and for both material handling implement operation and vehicle movement around the job site controlled by an operator situated in the upper cab. When driving to the job site the engine powers the lower chassis drive wheels through a torque converter and power shift transmission in a conventional manner. When remote chassis or material handling implement operation are to be directed from the upper cab, the engine, through a power takeoff on the torque converter, drives a hydraulic two section tandem pump. The engine does not then, due to the disconnection of appropriate clutches, deliver power to the driven chassis wheels in a conventional manner. The pressurized hydraulic fluid from the hydraulic pump is fed through a control valve to a remote drive hydraulic motor which produces rotational force that is driven into the transmission through a power input thereto. The transmission, through this second power input, drives the driven wheels of the vehicle. Direction of movement is selected by driving the hydraulic motor in the desired direction while three remotely controlled transmission gear ranges are available. In addition, the hydraulic pump provides pressurized hydraulic fluid through a flow divider to power the various manipulations of the material handling system.

The single engine thus supplies both conventional over-the-road power for the truck chassis and also power for the hydraulic pump and, hence, to the remote drive motor for onsite remote drive or to power the various implement operations. The drive arrangement allows either rear wheel drive or all wheel drive of the carrier since the transmission has output connections facing both forward and rearward. For a rear wheel drive configuration, the engine drives a torque converter to which a transmission is directly connected for driving, by means of a drive shaft, a rear drive axle and, hence, the rear wheels. In a four wheel drive configuration, the engine drives a torque converter which, in turn, drives a drive shaft. The drive shaft is coupled to the transmission which is moved rearwardly and which drives the rear drive axle and its rear wheels by means of a rear drive shaft and also a front drive axle and the front wheels by means of a front drive shaft coupled to the forward facing transmission output means.

To operate the material handling apparatus, the engine must not be running when shifting into the remote operating mode from the truck cab. Shifting to remote operation engages the hydraulic pump through a jaw clutch in operative connection with the torque converter. The engine is then started and the operator can operate the unit from the upper cab as he would a standard telescoping boom hydraulic material handler, such as an excavator. Control of the engine speed from the upper structure is accomplished through an air actuated throttle and an engine monitor.

The hydraulic pump is a two section unit. One section pumps hydraulic fluid through a travel control valve, which fluid then joins the hydraulic fluid from the other pump section and is piped through the center pin to the upper structure. On the upper structure the supply of hydraulic fluid is divided by the flow divider into separate flows to power the implement hydraulic circuits independently and simultaneously. If the operator engages the remote travel control, the flow to the upper structure is reduced but operation and continuance of all implement motions is still possible.

Accordingly, the present invention provides solutions to the aforementioned problems relating to a dual-engined material handling vehicle. As the single engine arrangement provided is sufficient to both routinely drive the truck chassis and to provide for remotely controlled travel and material handling implement control, the shortcomings of prior art material handling vehicles are overcome. In addition, the overall apparatus engineering, manufacture, operation and maintenance costs are significantly reduced.

These and other details, objects and advantages of the invention will become apparent as the following description of the present preferred embodiment thereof proceeds.

BRIEF DESCRIPTION OF THE DRAWINGS

For a better understanding of the invention reference may be had to the preferred embodiment exemplary of the invention shown in the accompanying drawings in which.

DETAILED DESCRIPTION OF THE PREFERRED EMBODIMENTS

Figure 1:
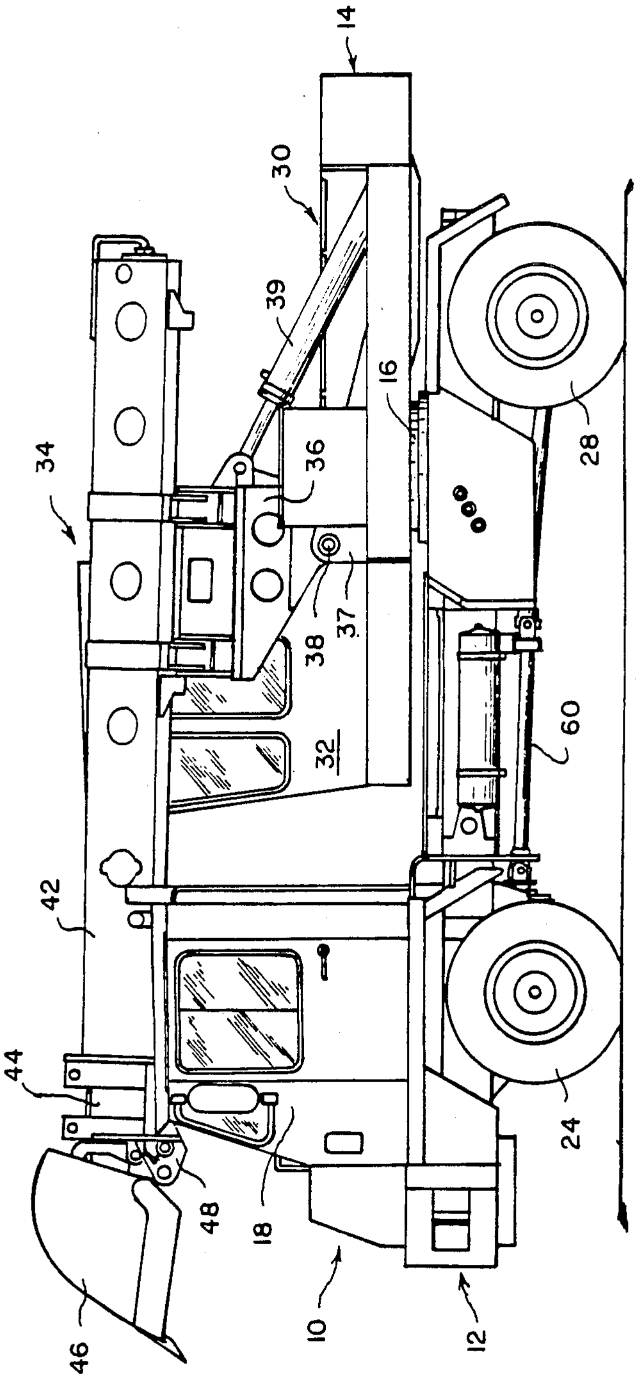
FIG. 1 is a left side view of a truck-mounted telescoping boom hydraulic excavator constructed according to the teachings of the present invention.
Figure 2:
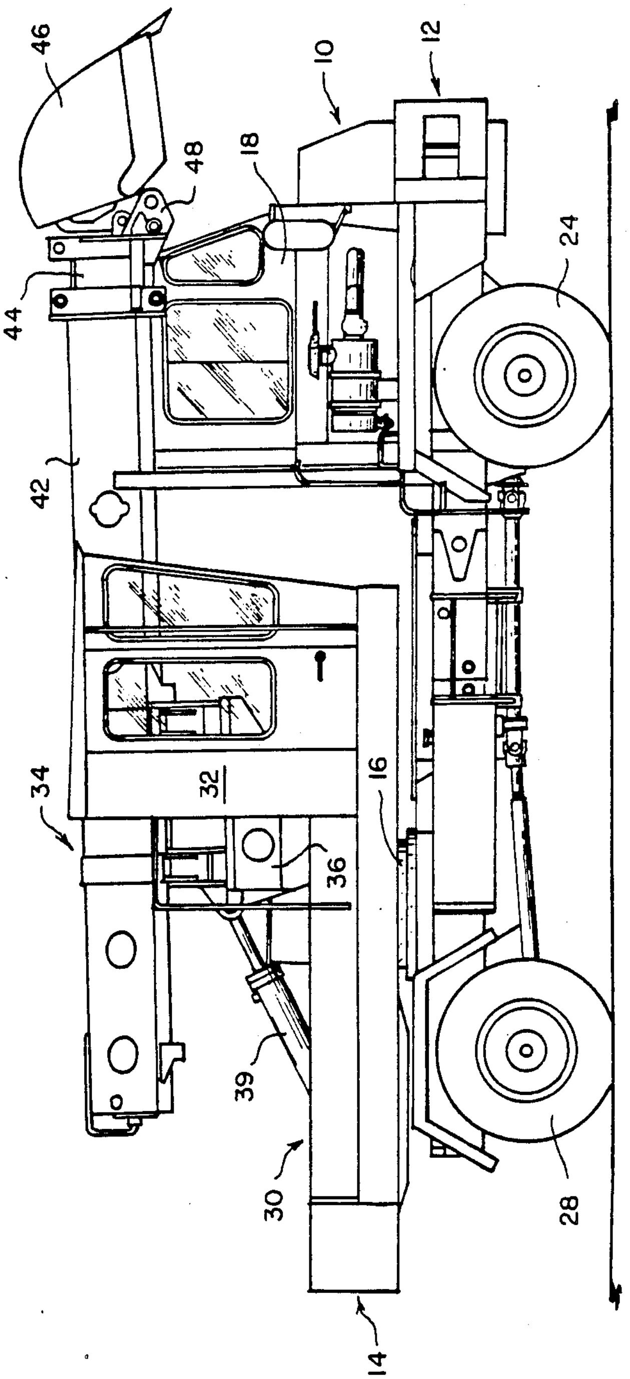
FIG. 2 is a right hand side view of the hydraulic excavator.
Figure 3:
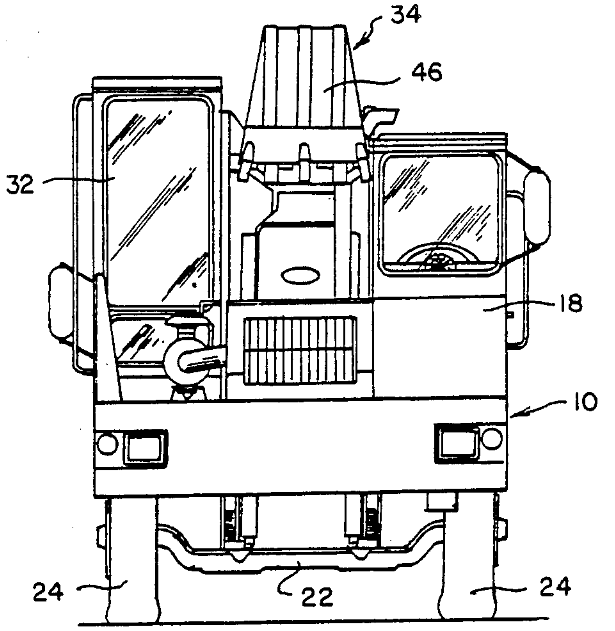
FIG. 3 is a front view of the hydraulic excavator.
Figure 4:
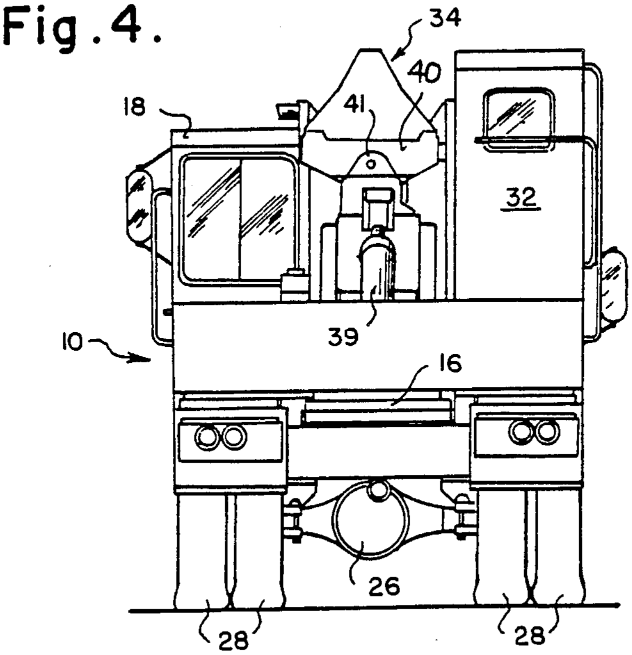
FIG. 4 is a rear view of the hydraulic excavator.

Referring now to the drawings wherein the showings are for purposes of illustrating the present preferred embodiment of the invention only and not for purposes of limiting same, the figures show a mobile material handling vehicle 10 which, for purposes of the present DETAILED DESCRIPTION OF THE PREFERRED EMBODIMENTS, will be described as an extensible or telescoping boom hydraulic excavating apparatus, also called an excavator. It is to be understood that various other forms of material handling apparatuses are also contemplated herein as being within the scope of the present invention.

More particularly and with reference to FIG. 1, there is shown an excavator 10 which includes a lower truck chassis 12 and an upper structure 14 rotatably supported thereon by means of a swing bearing 16 through which passes a center pin 17 such that the upper structure is rotatable with respect to the lower chassis by means of a hydraulic swing motor (not shown). Lower chassis 12 is provided with a truck cab 18 mounted beside an engine 20 with conventional engine controls passing therebetween. A front axle 22 supports the end of lower chassis 12 nearest truck cab 18 on front wheels 24 while a rear axle 26 supports the rear of lower chassis 12 on rear wheels 28.

The upper structure 14 includes a platform, generally indicated as 30 on one end of which is mounted a remote upper structure operator's cab 32. In addition, an extensible boom means, generally 34, is mounted to a boom support cradle 36 which is pivotally attached to an upstanding support member 37 of upper platform 30 by means of pins 38, which construction allows boom 34 to be vertically pivotable with respect to upper platform 30. Such vertical pivoting of boom 34 is accomplished by means of hydraulic hoist cylinder 39 pivotally attached between boom cradle 36 and the end of upper platform 30 remote from operator cab 32. Boom cradle 36 is provided with laterally extending cradle arms 40 which are pivotally attached to the base portion 41 of cradle 36 and which are pivotable relative thereto by means of a hydraulic cylinder (not depicted). As such, boom 34 is tiltable about an axis parallel to its axis.

Boom 34 includes a first section 42 which is mounted to boom cradle 36 and a second section 44 which is provided to be supportable by and hydraulically retractable within first section 42 by a hydraulic means (not shown) known to those in the art. A material handling implement 46, such as a bucket, is preferably movably attached to the free end of second boom section 44 by means of a pivotable support 48 which is preferably pivotable by means of a hydraulic cylinder (not depicted).

With respect to the general operation of excavator 10, truck cab 18 is occupied by an operator during over the road or distant movement of the excavator 10 to a selected job site. Operator cab 32 is occupied by the operator for control of excavator 10 around a given job site and when it is desired to manipulate boom 34, a work implement such as a bucket 46 or to rotate upper structure 14 relative to truck chassis 12 in a manner known in the art. The movement of lower chassis 12 can be provided by either a two wheel drive system in which only rear wheels 28 are preferably driven or a four wheel drive system in which all wheels 24 and 28 are driven. General operating characteristics and functional capabilities of a material handling apparatus 10 are similar to those disclosed in U.S. Pat. Nos. 3,587,886; 3,599,814 and 3,666,125.

Figure 5:
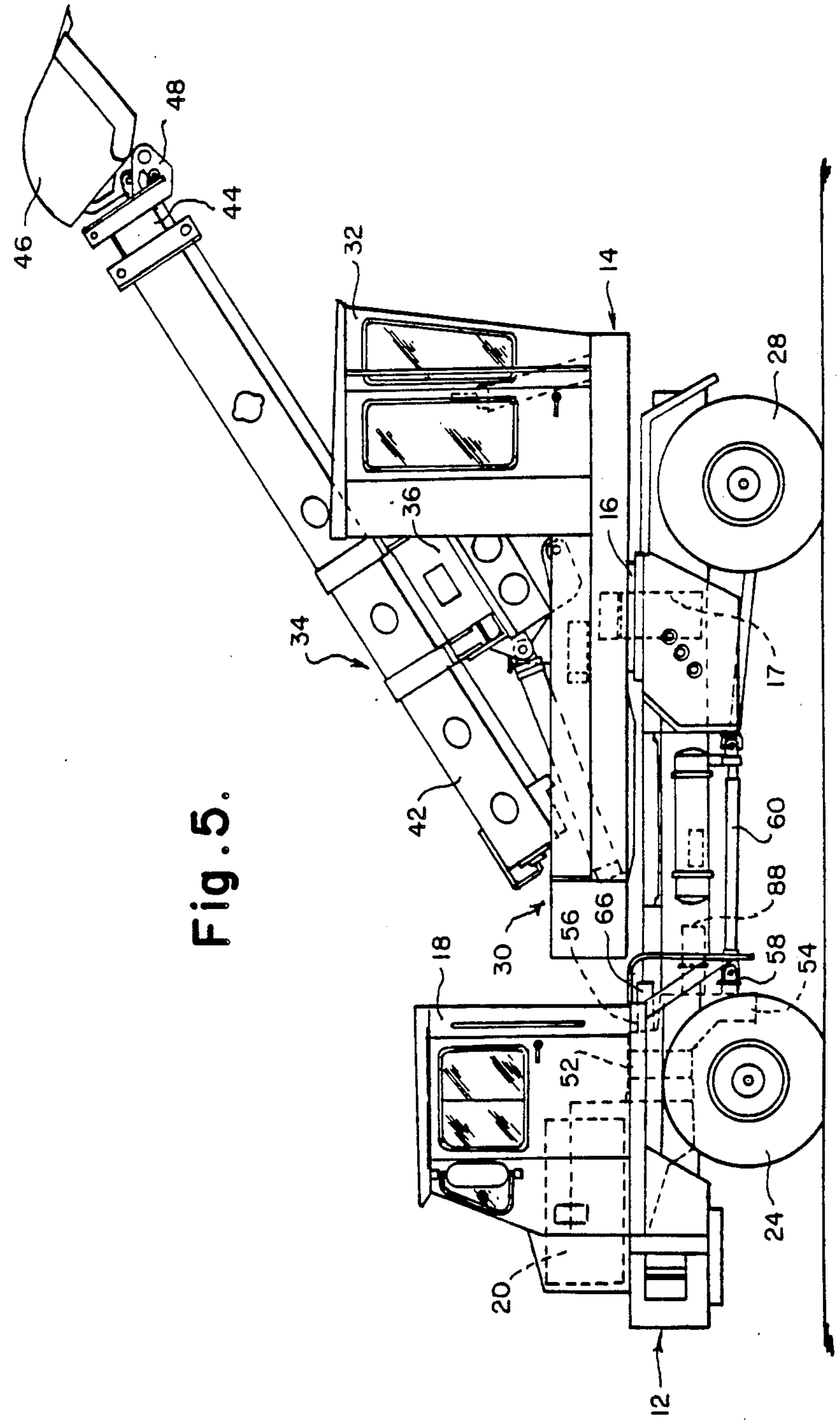
FIG. 5 is a side view of the hydraulic excavator of FIG. 1 with the upper structure rotated 180° and with select items shown in phantom to facilitate the explanation of the invention.
Figure 6:
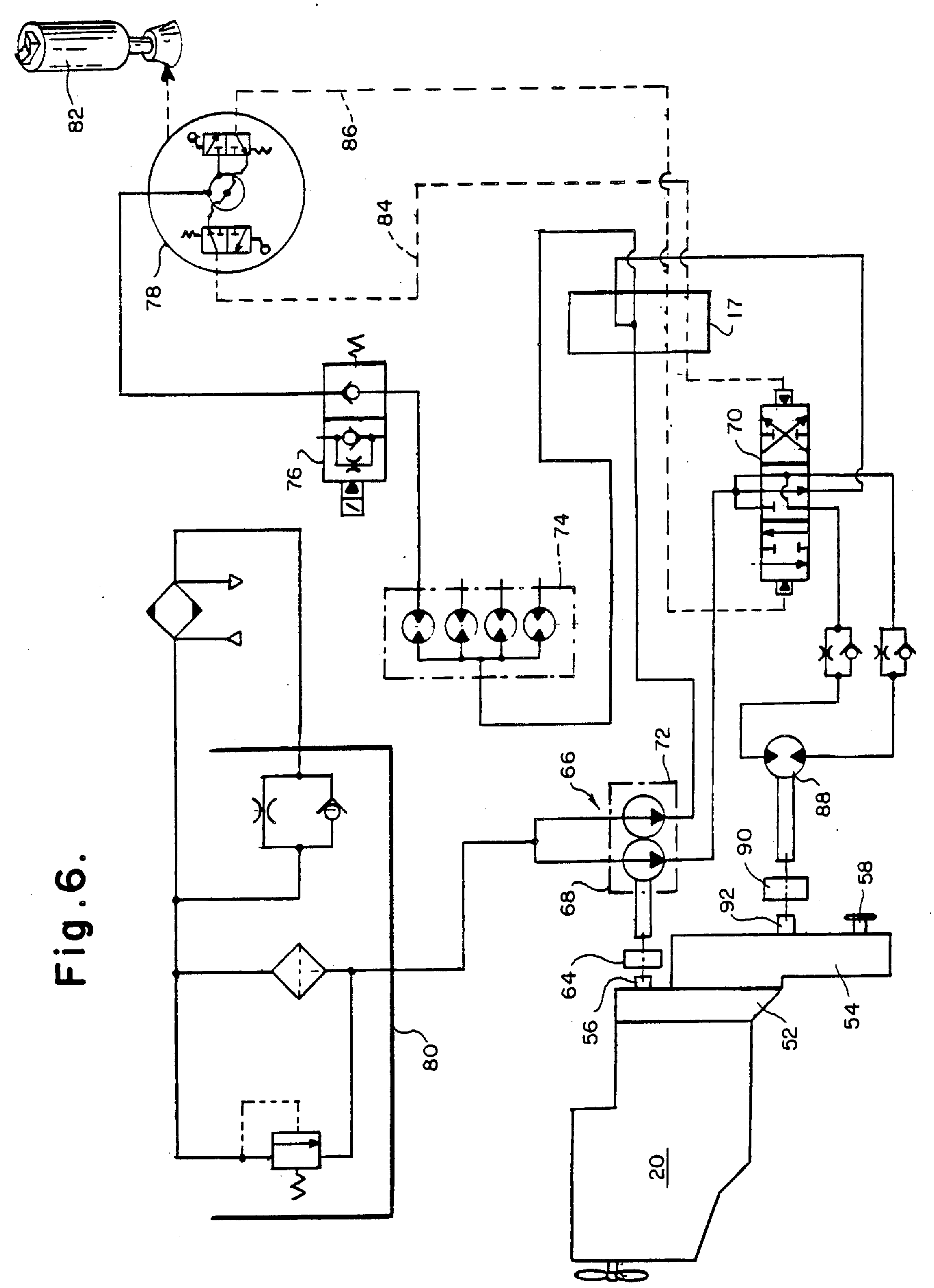
FIG. 6 is a hydraulic schematic showing portions of the hydraulic circuit for remote control of the single engine excavator shown in FIG. 5.
Figure 7:
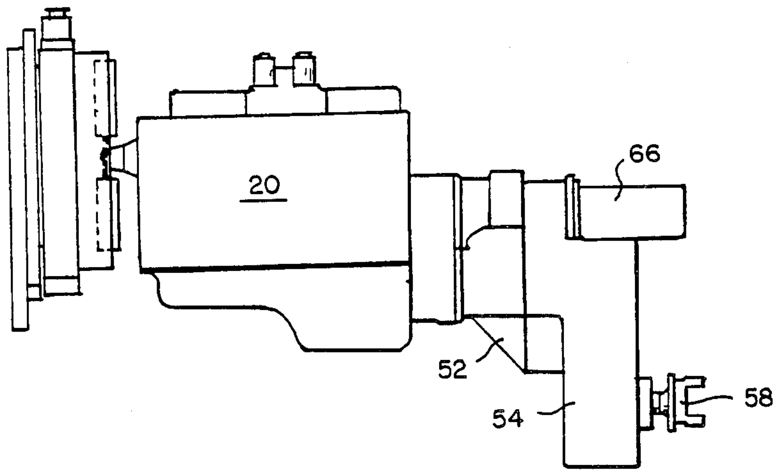
FIG. 7 is a simplified view of the engine and transmission used in the disclosed hydraulic excavators.
Figure 8:
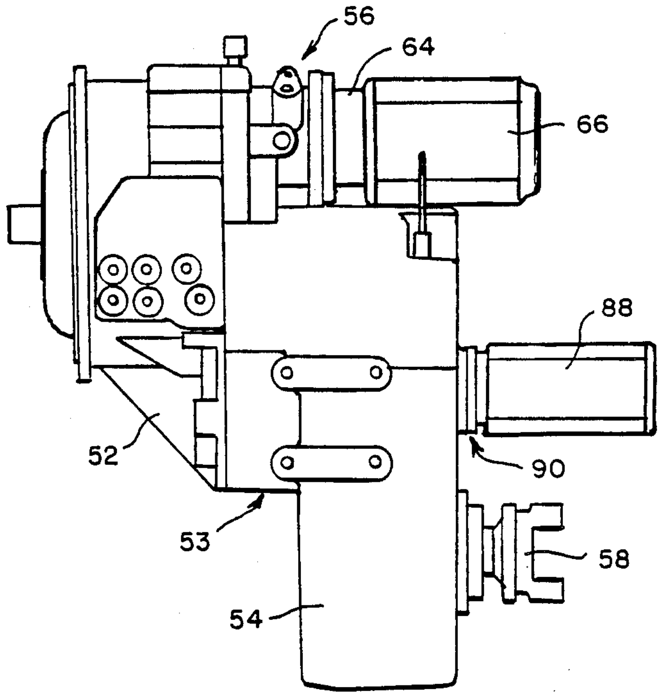
FIG. 8 is an enlarged side elevation view of the transmission with the hydraulic pumps and remote drive hydraulic motor.
Figure 9:
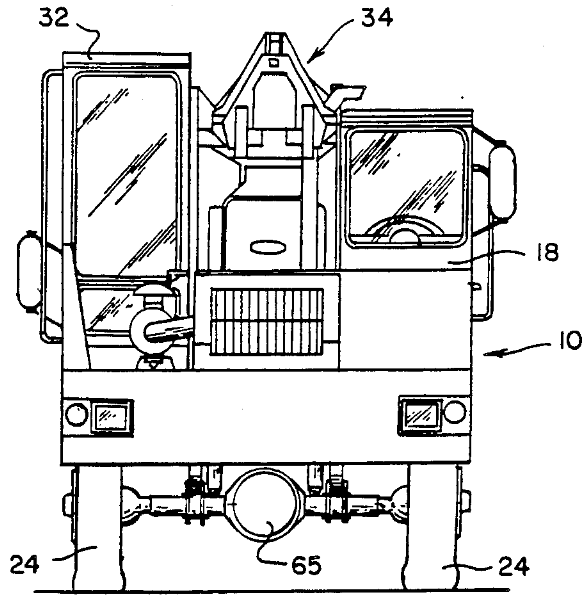
FIG. 9 is a front view of the four wheel drive version of the hydraulic excavator; and, FIG. 10 is a side view of the four wheel drive version of the hydraulic excavator with select items shown in phantom.

Referring now to FIG. 6, there is shown a hydraulic schematic and outlined representations of related components for controlling the movement of material handling apparatus 10 over the road by an operator in the truck cab 18 or for remote control at a job site by an operator in the upper cab 32 of the material handling implement 46 or of remote travel of excavator 10. FIG. 5 is provided to illustrate the position of various of the components of excavator 10 described in connection with FIG. 6.

An engine 20 provides power for both over the road and for the remotely controlled, job site operation of excavator 10. The engine 20 is provided on the front portion of lower chassis 12 and may comprise a suitable source of power for excavator 10 such as a Cummins Engine 6BT5.9 turbo charged diesel, liquid-cooled, 4-cycle inline 6-cylinder engine. A transmission 54 including a torque converter 52 is provided adjacent engine 20 to accept the rotational output thereof. Torque converter 52 provides two rotational outputs; one output drives through a first power input (not shown) to the gears of transmission 54, while the other provides a power take off 56 mechanically around transmission 54. Transmission may preferably comprise a six speed full powershift transmission with 6 speeds forward, 3 reverse and neutral, such as that manufactured by Funk, Inc. and designated as Model 2000. Forward motion, reverse motion and the gear range employed may be selected through the use of electrically controlled solenoids and hydraulically actuated multiple disc clutches mounted within transmission 54. The clutches are preferably hydraulically applied and spring released. Transmission 54 preferably has a rearward-facing power output 58 which, through driveshaft connection 60 can drive a rear axle 26 and, hence, the rear wheels 28.

Figure 10:
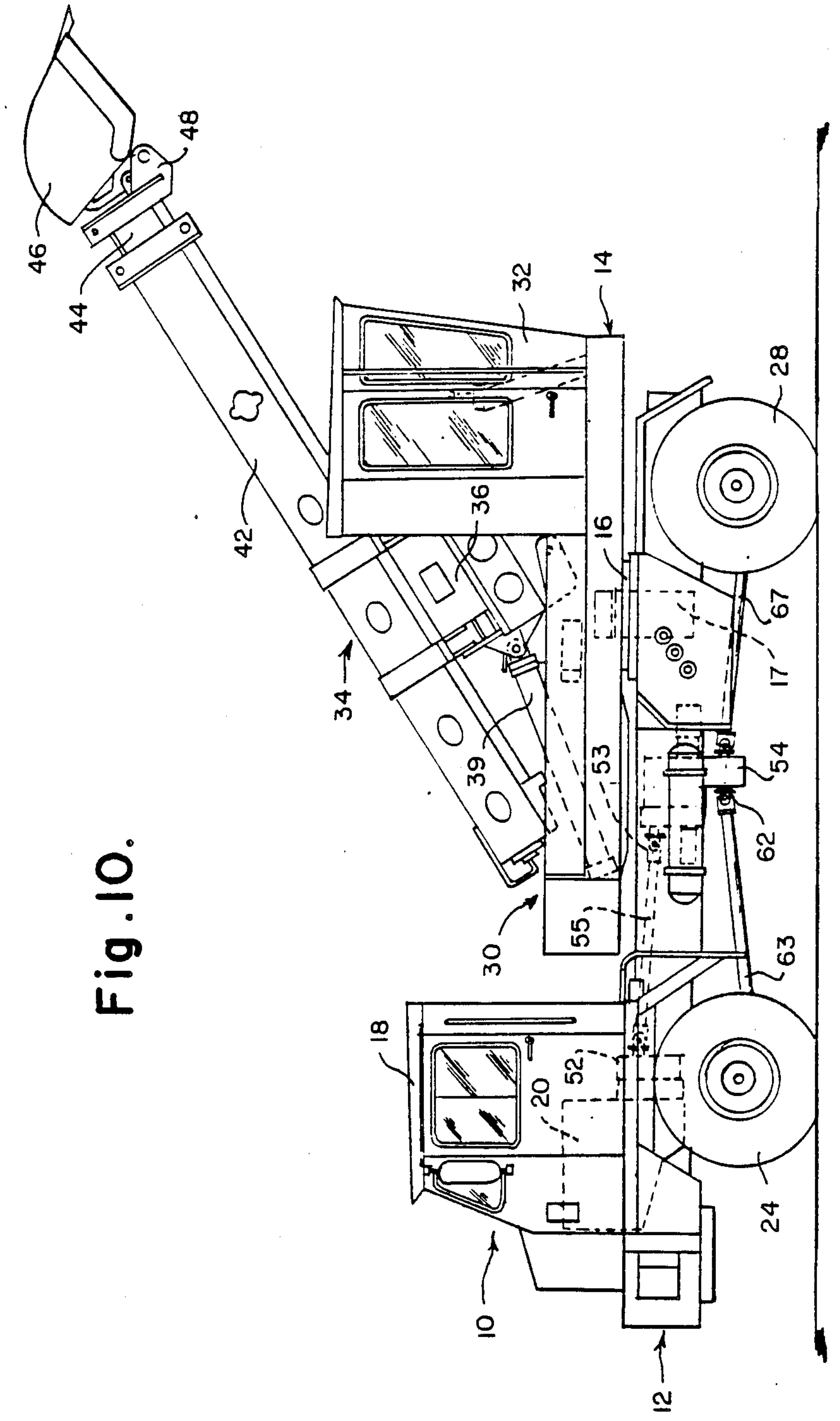
Figure 6:
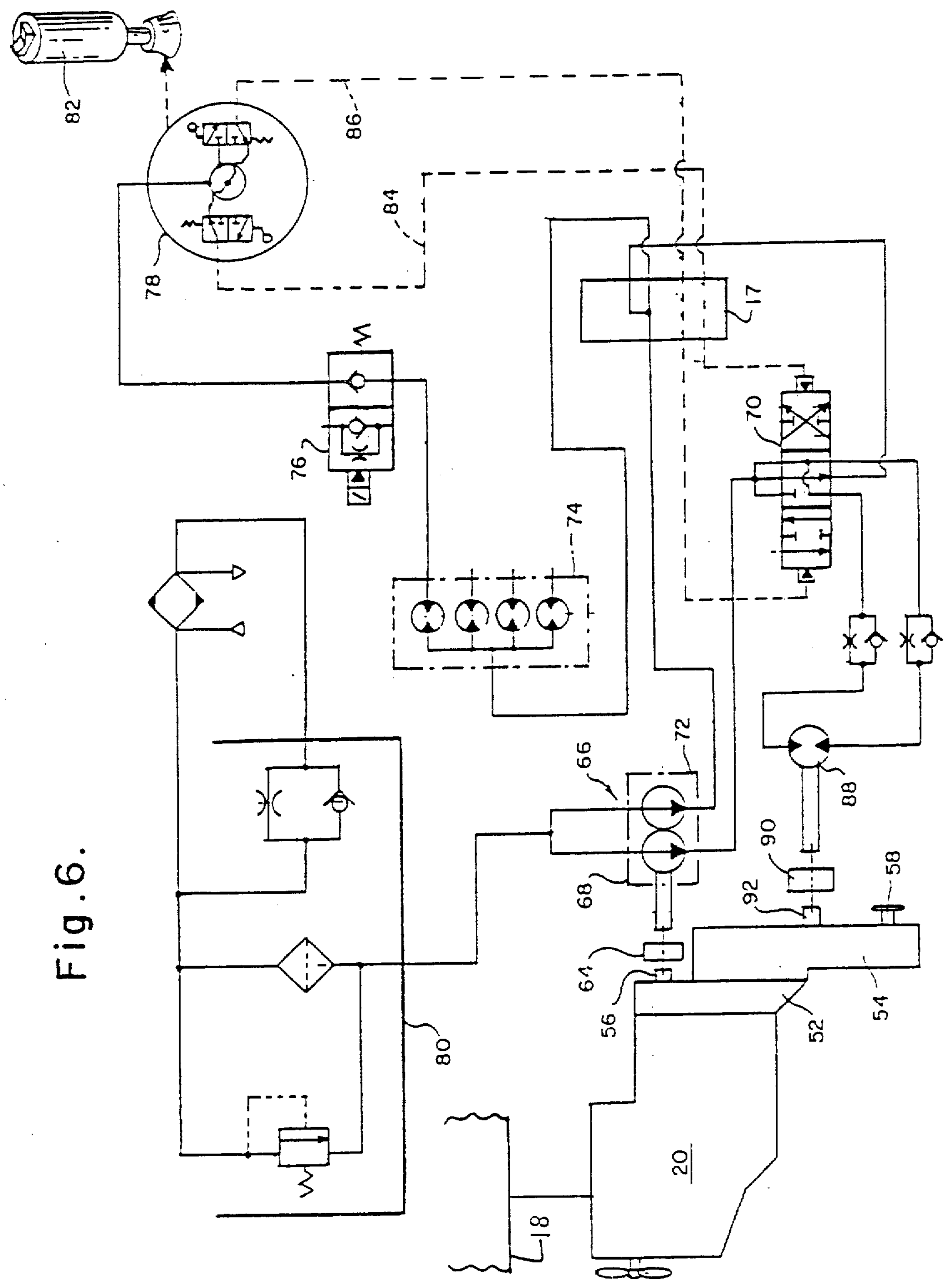

FIG. 10 is provided to show the location of various components of a four wheel drive version of excavator 10. In that case transmission 54 also preferably is provided with a frontward facing power output 62 which can be used for providing power to the front wheels 24 of excavator 10 for a four wheel drive system. For a four wheel drive excavator 10, the transmission 54 is preferably located further rearward and its forward facing first power input 53 is connected to torque converter 52 by means of a drive shaft input 55. In the four wheel drive system, a front drive shaft 63 is coupled to the front transmission output 62 to drive a front drive axle 65 and, hence, front wheels 24. A short rear drive shaft 67 is provided between rear transmission output 58 and the rear drive axle 26 to drive rear wheels 28. In either two or four wheel drive versions, during over the road operation, material handling apparatus 10 is driven by the engine 20 through torque converter 52 to first power input 53 and into transmission 54 in a conventional manner.

When at the job site, if operation of the material handling implement or remote travel is desired to be controlled from upper operator cab 32 with the electrically controlled solenoids and hydraulically actuated clutches of transmission 54 disengaged, the engine 20 drives through the torque converter 52 to power take off 56 which is mechanically connected to a jaw clutch 64. When jaw clutch 64 is engaged, a chassis hydraulic pump 66 is thereby driven. At such time, the engine is supplying mechanical drive power through torque converter 52 only to chassis hydraulic pump 66. The upper portion of transmission 54 is disengaged from the transmission drive output 58 by not energizing the hydraulically actuated clutches located within transmission 54.

Hydraulic pump 66 is preferably a two section unit. A first pump section 68 pumps hydraulic driving fluid directly to a travel control valve 70 which, when travel is authorized, causes hydraulic fluid to flow to the hydraulic drive motor (described herein). Travel control valve 70 is a conventional control valve having inlet and outlet sections with a control section therebetween. The second pump section 72 pumps hydraulic fluid to the upper structure 14 through the center pin 17. One output line from travel control valve 70 passes through the center pin 17 such that if no travel functions are required, the hydraulic fluid passing directly to travel control valve 70 from first pump section 68 of hydraulic pump 66 can be redirected into flow divider 74 to provide additional hydraulic fluid to power the excavator functions. On the upper structure 14, the hydraulic fluid from the second pump section 72 and, if available, from first section 68, is divided by a flow divider 74 to provide the motive fluid to power the various functions of excavator 10 which are controlled by an operator in operator cab 32. Flow divider 74 is basically a hydraulic motor having a common drive shaft and different width gears intended to provide four (4) discrete hydraulic fluid outputs. Such outputs provide hydraulic fluid under pressure for use in powering, under the control of an operator in upper cab 32: (1) the boom 34 hoist circuit which includes hoist cylinder 39; (2) the boom 34 extension circuit; (3) the swing of upper structure 14 relative to truck chassis 12, the bucket 46 opening function, and the tilting of boom 34; and, (4) the travel actuator control (described hereinbelow) as well as other excavator 10 controls and remote power steering controls. While the powering of items (1), (2), and (3) listed immediately above is typically accomplished by means of separate hydraulic pumps, in the present apparatus such functions may be powered by hydraulic outputs from flow divider 74 by means known to those skilled in the art.

The hydraulic fluid for controlling the various functions of excavator 10, as well as for providing pressure for power steering control and hydraulic fluid for controlling the travel function, exits one section of the flow divider 74 and is directed into a relief valve 76. Relief valve 76 provides a constantly available pressure of hydraulic fluid to a travel actuator 78 which controls the direction and activation of vehicle 10 remote travel. Relief valve 76 also provides hydraulic fluid to other hydraulic lines for the control of the various excavator 10 functions enumerated above and to power the remote control of the power steering of excavator 10. Excess hydraulic fluid is vented from relief valve 76 back through center pin 17 to a hydraulic fluid reservoir 80.

The disposition of hydraulic fluid passing to travel actuator 78 is controlled by a manually actuatable control means 82, preferably consisting of a joystick. Control 82 causes travel actuator 78 to direct hydraulic fluid through one of two lines 84 or 86, respectively, passing through center pin 17 and to travel control valve 70. In particular, the displacement of control 82 in one direction causes travel actuator 78 to allow hydraulic fluid to pass through line 84 which displaces travel control valve 70 in one direction which allows fluid from first pump section 68 to flow through one section of travel control valve 70. The displacement of control 82 in the opposite direction causes hydraulic fluid to enter line 86 to displace travel control valve 70 in the opposite direction which allows fluid from first pump section 68 to flow through the opposite side of travel control valve 70. As such, when joystick control 82 by means of travel actuator 78 indicates a desire to initiate travel by causing hydraulic fluid to flow in either line 84 or 86, the travel control valve 70 is also activated to allow hydraulic fluid flow from first pump section 68 through control valve 70 to either side of a hydraulic drive motor 88. When control valve 70 senses no signal from either line 84 or line 86, the hydraulic fluid flow from pump section 68 passes through valve 70 and center pin 17 and joins the flow from second pump section 72. Two output lines are provided from travel control valve 70 to pass into a hydraulic drive motor 88 which is connected via a jaw clutch 90 to a lower additional input 92 of transmission 54.

In summary, when the control 82 is moved forward away from the operator, hydraulic fluid is caused by travel actuator 78 to travel in line 84 to displace travel control valve 70 in one direction to allow flow from first pump section 68 through one section of travel control valve 70 to one side of the hydraulic motor 88 which causes it to rotate in a forward direction. Such rotation of hydraulic motor 88 causes the transmission 54 and, hence, transmission output 58 to rotate in a forward direction driving the rear drive wheels 28 in the forward direction. When control 82 is moved in the reverse direction, hydraulic fluid is caused to travel in line 86 to the other section of travel control valve 70 to displace it in the opposite direction to allow flow from first pump section 68 through travel control valve 70 to rotate hydraulic motor 88 in the reverse direction which causes the transmission 54 and, hence, transmission output 58 to rotate in the reverse direction thereby driving the rear drive wheels 28 in the reverse direction.

To operate excavator 10, the engine on lower chassis 12 is shut off when shifting into remote from the truck cab 18. By selecting the remote mode of operation of vehicle 10, the chassis hydraulic pump 66 is engaged through jaw clutch 64 to the torque converter 52 and jaw clutch 90 is caused to engage secondary transmission power input 92. To start engine 20, the ignition switch is turned on in the truck cab 18. Engine 20 can then be started from truck cab 18 or upper cab 32. The operator in cab 32 can then operate the unit similarly as he would in other remotely controllable excavators. As such, the remotely controlled travel of excavator 10 is provided by the hydraulic drive means described above, while the manipulations of the material handling implement are motivated by hydraulic fluid flows provided by the flow divider 74.

The disclosed construction of hydraulic excavator 10 lowers the machine center of gravity and improves machine stability compared to current excavators because by the use of a single engine 20, the auxilliary engine and related accessories, drives and pumps, reservoirs etc. are removed from the rotating upper structure 30 and located on the lower chassis 12. The upper counter-weight to which the engine contributed is replaced by a much lower profile counterweight. Machine weight and cost are reduced significantly because only one of each of the following are required with the disclosed single engine machine; fuel tank, radiator, battery and charging system, air compressor and air dryer, power steering pump, air cleaner and exhaust system, clutch, engine, shrouding and mounting, noise barriers, engine gauges as well as reduced instrumentation and controls. Control of the carrier engine speed from the upper cab can be accomplished through an air actuated throttle.

It will be understood that various changes in the details, materials and arrangements of parts which have been herein described and illustrated in order to explain the nature of the invention, may be made by those skilled in the art within the principle and scope of the invention as expressed in the appended claims.

What is claimed is:

1. A material handling vehicle capable of over-road travel to and from a job site comprising:

a. a lower truck chassis supported by a plurality of wheels, at least two of which are drive wheels, said lower truck chassis having a first operator's station;
b. an upper structure mounted on said lower chassis and having a second operator's station;
c. a manipulatable material handling implement mounted on said upper structure;
d. an engine mounted on said lower chassis, said engine being controllable from said first operator's station;
e. hydraulic power means powered by said engine, said hydraulic power means being controllable from said second operator's station, said hydraulic power means comprising:
  (i) a hydraulic drive means; and
  (ii) an implement power means coupled to said material handling implement for manipulating said material handling implement; and
f. a powershift transmission mounted on said lower chassis, said transmission haiving a primary input means coupled to said engine, a secondary input means coupled to said hydraulic drive means and an output drive means coupled to said drive wheels, so that said engine and said primary input means or said hydraulic drive means and said secondary input means may drive through said transmission to drive said drive wheels.

2. Apparatus of claim 1 in which said hydraulic drive means comprises:

a. a hydraulic pump selectively coupled to said engine; and,
b. a hydraulic drive motor in fluid communication with said hydraulic pump and selectively coupled to said secondary input means.

3. Apparatus of claim 2 further comprising a travel control valve in fluid communication between said hydraulic pump and said hydraulic drive motor, said travel control valve further comprising means for either allowing hydraulic fluid flow from said hydraulic pump to said hydraulic drive motor or for prohibiting such flow.

4. Apparatus of claim 3 in which said hydraulic drive motor comprises a hydraulic motor which may provide a rotational output in a forward direction or in a reverse direction.

5. Apparatus of claim 4 in which said travel control valve further comprises means for controlling the direction of rotation of said hydraulic motor.

6. Apparatus of claim 5 in which said hydraulic pump comprises:

a. a first pump section for pumping hydraulic fluid under pressure to said travel control valve; and,
b. a second pump section for pumping hydraulic fluid to said implement power means.

7. Apparatus of claim 6 in which said implement power means further comprises a hydraulic fluid flow divider in fluid communication with said second pump section, said flow divider having a first flow output and an implement flow outlet in fluid communication with said material handling implement.

8. Apparatus of claim 7 further comprising a travel actuator in fluid communication with said first flow output of said flow divider, said travel actuator being in fluid communication with said travel control valve, said travel actuator further comprising means for controlling hydraulic fluid flow from said flow divider to said travel control valve and for controlling whether said travel control valve allows hydraulic fluid flow from said hydraulic pump to said hydraulic motor.

9. Apparatus of claim 8 in which said travel actuator further comprises means for controlling said means in said travel control valve for controlling the direction of rotation of said hydraulic motor.

10. Apparatus of claim 9 comprising a joystick means mounted in said second operator's station and operatively connected to said travel actuator, said joystick means further comprising means for controlling said travel actuator.

11. Apparatus of claim 10 further comprising:
a. a hydraulic fluid reservoir; and,
b. a relief valve in fluid communication between said flow divider and said travel actuator, said relief valve including means effective to control the maximum hydraulic pressure passing from said flow divider to said travel actuator and for causing any pressure in excess of said maximum pressure to be vented to said hydraulic fluid reservoir.

12. Apparatus of claim 11 in which said travel control valve includes controllable means for directing hydraulic fluid to said flow divider rather than to said hydraulic motor.

13. Apparatus of claim 1 further comprising:
a. means for horizontally pivotally supporting said upper structure on said lower chassis; and,
b. means for pivoting said upper structure relative to said lower chassis.

14. Apparatus of claim 13 in which said material handling implement comprises:
a. an extensible boom, said boom having a base boom section and at least one second boom section telescopically received in and supported by said base boom section;
b. boom support means for vertically pivotally supporting said base boom section on said upper structure;
c. means connected intermediate said base boom section and said upper structure for vertically pivoting said base boom section relative to said upper structure;
d. means for extending and retracting said second boom section relative to said base boom section;
e. a work tool connected to the free end of said second boom section; and,
f. means for pivoting said tool relative to said second boom section.

15. Apparatus of claim 14 further comprising:
a. means for supporting said base boom such that said base boom section is tiltable about an axis parallel to its axis; and,
b. means for tilting said boom about its axis.

16. Apparatus of claim 15 in which said work tool comprises:
a. a bucket; and,
b. means for pivotally supporting said bucket on said free end of said second boom section.

17. Apparatus of claim 16 in which said hydraulic power means comprises:
a. a hydraulic drive means selectively coupled to said drive wheels; and,
b. an implement power means selectively coupled to said material handling implement for manipulating said material handling implement.

18. Apparatus of claim 17 in which said implement power means comprises:
a. a hydraulic pump selectively coupled to said engine;
b. means for selectively coupling said engine to said hydraulic pump; and,
c. flow divider means in fluid communication with said hydraulic pump and with said material handling implement for controlling hydraulic flow to said material handling implement.

19. Apparatus of claim 18 further comprising means connecting in fluid communication said flow divider with said means for pivoting sid upper structure, said means for pivoting said base boom section relative to said upper structure, said means for extending and retracting said second boom section, said means for pivoting said tool and said means for pivoting said base boom section about its axis.

20. Apparatus of claim 1 in which said drive wheels comprise all of the wheels in said plurality of wheels.

21. Apparatus of claim 1 further comprising:
a. a front drive axle means attached to the front of said truck chassis, said front drive axle means being coupled to said powershift transmission;
b. said plurality of wheels comprising front drive wheels rotatably attached to and drivable by said front drive axle means;
c. rear drive axle means attached to the rear of said truck chassis, said rear drive axle means being coupled to said powershift transmission; and,
d. said plurlaity of wheels comprising rear drive wheels rotatably attached to and drivable by said rear drive axle means.

22. A material handling vehicle comprising:
a. a drivable main chassis having a main drive cab;
b. an upper structure having a material handling device supported thereon and being rotatably attached to said main chassis and having a upper structure operator cab;
c. a hydraulic pump for providing an output of pressurized hydraulic fluid;
d. an engine supported on said main chassis, connectable to drive said hydraulic pump and disconnectable from said hydraulic pump for providing power for driving a first drive means;
e. a hydraulic motor which when activated provides power for driving a secondary drive means;
f. control means responsive to an operator in the upper structure operator cab for connecting the hydraulic output of said hydraulic pump to said hydraulic motor; and
g. a powershift transmission mounted on said main chassis and effective to provide output power to drive said main chassis, said transmission being powered by either said first drive means or said second drive means.

23. An excavator comprising:
a. a chassis having a drive engine and a main cab;

b. a movable upper structure supported by said chassis having a material handling implement and an operator cab;

c. a plurality of wheels, some of which are driven, supporting said chassis;

d. a hydraulic power source which when driven provides a source of pressurized hydraulic fluid;

e. means for connecting said drive engine to drive said hydraulic power source and for disconnecting said drive motor from said hydraulic power source for driving a first drive means;

f. a hydraulic motor for driving a second drive means;

g. hydraulic drive actuating means controlled from said operator cab for connecting at least a portion of the hydraulic fluid from said hydraulic power source to said hydraulic drive motor; and, h. a powershift transmission mounted on said chassis and effective to provide output power to drive the driven wheels, said transmission being powered by either said first drive means or said second drive means.

* * * * *

UNITED STATES PATENT AND TRADEMARK OFFICE

CERTIFICATE OF CORRECTION

PATENT NO. : 4,705,450

DATED : November 10, 1987

INVENTOR(S) : John W. Gano

It is certified that error appears in the above-identified patent and that said Letters Patent is hereby corrected as shown below:

The sheet of drawing containing figure 6 should be deleted to be replace with figure 6 as shown on the attached sheet.

The title page should be deleted to appear as per attached title page.

Column 5, line 27, after "Transmission" insert --54--

Column 9, line 20, after "9" insert --further--

Column 10, line 23, "sid" should read --said--

Column 10, line 41, "plurlaity" should read --plurality--.

Signed and Sealed this

Twenty-fourth Day of May, 1988

*Attest:*

DONALD J. QUIGG

*Attesting Officer*

*Commissioner of Patents and Trademarks*

United States Patent [19]
Gano

[11] Patent Number: 4,705,450
[45] Date of Patent: Nov. 10, 1987

[54] SINGLE ENGINE EXCAVATOR WITH REMOTE CONTROL

[75] Inventor: John W. Gano, New Philadelphia, Ohio

[73] Assignee: The Gradall Company, New Philadelphia, Ohio

[21] Appl. No.: 807,616

[22] Filed: Dec. 11, 1985

[51] Int. Cl.⁴ ........................ B60K 17/28; B60K 26/02
[52] U.S. Cl. ........................................ 414/687; 60/420; 60/421; 180/53.4; 180/53.8; 180/323; 180/324; 414/718
[58] Field of Search ............... 414/687, 690, 718, 728; 37/DIG. 17; 180/53.4, 53.7, 53.8, 321, 323, 324, 6.58, 6.6; 60/420, 421, 427

[56] References Cited

U.S. PATENT DOCUMENTS

| | | | |
|---|---|---|---|
| Re. 31,500 | 1/1984 | Brownfieid . | |
| 2,638,232 | 5/1953 | Perkins | 180/324 X |
| 2,704,131 | 3/1955 | Vahs | 180/306 |
| 2,708,400 | 5/1955 | Legus | 60/437 |
| 2,731,097 | 1/1956 | Zeilman et al. | 180/324 X |
| 2,765,041 | 10/1956 | Norrie et al. . | |
| 2,783,556 | 3/1957 | Burns et al. | 37/90 |
| 2,817,911 | 12/1957 | Owen et al. | 37/90 |
| 2,866,510 | 12/1958 | Flamm | 180/53.7 |
| 2,959,260 | 11/1960 | Johnson et al. . | |
| 2,979,908 | 4/1961 | Shook | 414/687 X |
| 2,981,012 | 4/1961 | Meyer | 37/86 |
| 3,300,069 | 1/1967 | Kline | 414/718 |
| 3,587,886 | 6/1971 | Gano et al. | 414/718 |
| 3,599,814 | 8/1971 | Brownfield | 180/53.4 |
| 3,666,125 | 5/1972 | Gano et al. | 414/718 |
| 3,854,160 | 12/1974 | Hildebrand et al. | 15/84 |
| 3,913,697 | 10/1975 | Greene | 180/53.4 |
| 3,935,917 | 2/1976 | Eley et al. | 180/53.4 |
| 3,949,824 | 4/1976 | Bennett | 180/305 X |
| 4,015,482 | 4/1977 | Ito et al. | 74/15.84 |
| 4,023,364 | 5/1977 | Bianchetta | 414/687 X |
| 4,036,508 | 7/1977 | Eddy et al. | 180/53.1 X |
| 4,162,714 | 7/1979 | Correll | 180/53.4 |
| 4,189,021 | 2/1980 | Scheuerpflug et al. | 414/718 X |
| 4,313,451 | 3/1982 | Liggett . | |
| 4,467,604 | 8/1984 | Forster | 180/6.58 X |
| 4,484,655 | 11/1984 | Sheppard, Sr. | 180/305 X |
| 4,516,655 | 5/1985 | Donahue et al. | 37/DIG. 17 |

FOREIGN PATENT DOCUMENTS

| | | | |
|---|---|---|---|
| 2915964 | 11/1980 | Fed. Rep. of Germany | 180/53.2 |
| 3219971 | 12/1983 | Fed. Rep. of Germany | 180/305 |
| 846241 | 8/1960 | United Kingdom | 414/690 |
| 337469 | 2/1978 | U.S.S.R. | 37/DIG. 17 |

OTHER PUBLICATIONS

Funk Series 8000 Powershift Transmission Brochure 4 pages.
Gradall Pamphlet, May 31, 1955, 20 pages.

*Primary Examiner*—Robert J. Spar
*Assistant Examiner*—P. McCoy Smith
*Attorney, Agent, or Firm*—Robert D. Yeager; George D. Dickos

[57] ABSTRACT

A material handling vehicle is provided which includes a lower truck chassis and an upper material handling structure pivotally supported by the lower chassis, all functions of which vehicle are driven by a single engine. The material handling vehicle is controllable from a main truck cab on the truck chassis or from an upper operator's cab mounted on the upper structure. The single engine provides highway travel power and power to all excavator functions, while the vehicle, including remote travel and implement manipulation capabilities, may be controlled from the upper operator cab. The main engine, when used for over the highway travel, powers the driven wheels through a power shift transmission in a conventional manner. When at an excavating site and controlled from the upper cab, the main engine, through a power takeoff on the top of the torque converter connected to the engine, drives a hydraulic pump which supplies hydraulic fluid to a flow divider to power the implement hydraulics and to drive a hydraulic drive motor in response to controls from the upper operator cab. The hydraulic drive motor drives into a secondary power input on a lower portion of the transmission to provide power through the transmission to the driven wheels.

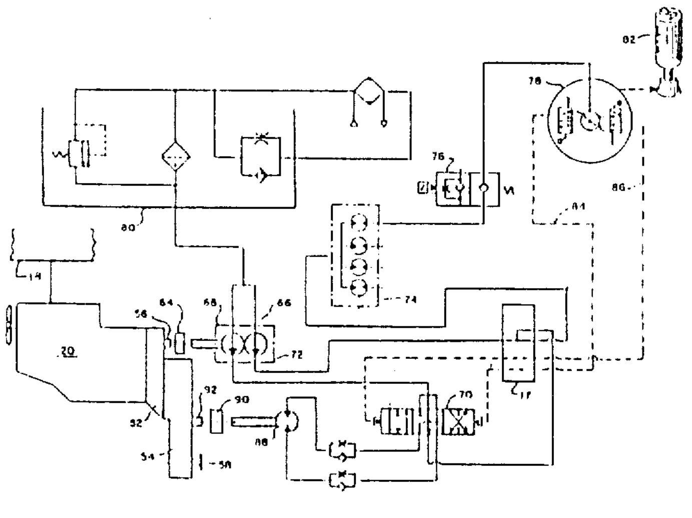

23 Claims, 10 Drawing Figures